US006879951B1

(12) United States Patent
Kuo

(10) Patent No.: US 6,879,951 B1
(45) Date of Patent: Apr. 12, 2005

(54) CHINESE WORD SEGMENTATION APPARATUS

(75) Inventor: June-Jei Kuo, Taipei (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 884 days.

(21) Appl. No.: 09/618,293

(22) Filed: Jul. 18, 2000

(30) Foreign Application Priority Data

Jul. 29, 1999 (JP) .......................................... 11-215119

(51) Int. Cl.[7] .......................... G10L 17/21; G10L 13/08

(52) U.S. Cl. ................................ 704/10; 704/9; 704/1; 704/260; 715/535; 715/532

(58) Field of Search .......................... 704/1–9, 10, 260; 715/535, 532

(56) References Cited

U.S. PATENT DOCUMENTS

| | | | | |
|---|---|---|---|---|
| 4,777,600 A | * | 10/1988 | Saito et al. | 715/535 |
| 4,937,745 A | * | 6/1990 | Carmon | 715/535 |
| 5,257,938 A | | 11/1993 | Tien | |
| 5,319,552 A | * | 6/1994 | Zhong | 715/535 |
| 6,014,615 A | * | 1/2000 | Chen | 704/3 |
| 6,587,819 B1 | * | 7/2003 | Lu | 704/257 |

FOREIGN PATENT DOCUMENTS

| | | |
|---|---|---|
| EP | 0271619 | 6/1988 |
| JP | 11-66061 | 3/1999 |

OTHER PUBLICATIONS

English Language Abstract of JP–11–66061.

"Automatic Word Identification in Chinese Sentences by the Relaxation Technique", Charng–Kang Fan et al., Proceedings of National Computer Symposium (1987).

* cited by examiner

*Primary Examiner*—Vijay Chawan

(74) *Attorney, Agent, or Firm*—Greenblum & Bernstein, P.L.C.

(57) ABSTRACT

A Chinese word segmentation apparatus relates to processing of a Chinese sentence input to a computer. A character-to-phonetic converter of the segmentation apparatus initially converts a Chinese sentence into a phonetic symbol string while referring to a character phonetic dictionary and a ductionary for characters with different pronunciations. Thereafter, a candidate word-selector refers to a system dictionary to retrieve all of the possible candidate characters or words in the phonetic symbol string and relevant information, such as frequency of use, using the phonetic symbols as indexing terms. Unfeasible candidate characters or words are discarded. Subsequently, an optimum candidate character string-decider builds a candidate word network using starting and ending positions of each candidate character or word in the input sentence as indexing terms. By referring to semantic and syntax information portions, frequency of use prioritization, word length prioritization, semantic similarity prioritization and syntax prioritization are combined to obtain a total estimate. The optimum route for word segmentation marking portion adds word segmentation markers into the input sentence while referring to the optimum route to complete word segmentation.

1 Claim, 12 Drawing Sheets

| CHARACTER | INITIAL PRESET PHONETIC SYMBOL | OTHER POSSIBLE PHONETIC SYMBOLS |
|---|---|---|
| : | : | : |
| 把 | BA3 | |
| : | : | : |
| 他 | TA1 | |
| : | : | : |
| 的 | DE0 | DI2, DI4 |
| : | : | : |
| 確 | QYUE4 | |
| : | : | : |
| 實 | SH2 | |
| : | : | : |
| 行 | XING2 | HANG2, HANG4, XING4 |
| : | : | : |
| 動 | DONG4 | |
| : | : | : |
| 作 | ZUO4 | |
| : | : | : |
| 了 | LE0 | LIAU3 |
| : | : | : |
| 研 | IAN2 | |
| : | : | : |
| 究 | JIOU4 | |
| : | : | : |
| : | : | : |

FIG. 7

| PHONETIC SYMBOL | SIMILARLY SOUNDING CONFLICTING CHARACTERS /WORDS AND RELEVANT FREQUENCY OF USE, SEMANTIC MARKER, SYNTAX MARKER |
|---|---|
| : | : |
| BA3 | 把0.53,PREP,832A 靶 0.19,N,9700.......... |
| : | : |
| TA1 | 他0.23,N,5030 它 0.11,N,0610 牠 0.02,N,0610........... |
| : | : |
| DE0 | 的0.97,PREP,832A.......... |
| : | : |
| QYUE4 | 確0.27,ADV,154D 卻 0.39,ADV,154F雀,0.17,N,061D........ |
| : | : |
| SH2 | 時0.18,N,828F十0.21,N120B 實 0.09,N,175A........ |
| : | : |
| XING2 | 行0.13,V,361A 型 0.07,N,1800 形 0.17,N,1100........ |
| : | : |
| DONG4 | 洞0.13,N,112E 動 0.31,V,2100 凍 0.11,V,2510........ |
| : | : |
| ZUO4 | 做0.31,V,3610 坐 0,21,302BV,作 0.29,V,3610........ |
| : | : |
| LE0 | 了1,ASP,273A |
| : | : |
| IAN2 | 鹽0.22,N,9250 沿 0.12,V,108G 言 0.07,V,3400 研 0.14,V,4240..... |
| : | : |
| JIOU4 | 就0.39,ADV,154F 舊 0.13,ADJ,139B 究 0.08,V,4240......... |
| : | : |
| QYUERSH2 | 確實1,ADV,166B |
| : | : |
| SH3XING2 | 實行0.71,V,3610實行0,29,N,3610 |
| XING2DONG4 | 行動0.45,N,3600 行動 0.55,V,3600 |
| DI3QYUE4 | 的確1,ADV,166B |
| IAN3JIOU4 | 研究0,63,V,4240 研究 0.37,N,4240 |
| : | : |

FIG.8

| FRONT-PART SYNTAX MARKER \ REAR-PART SYNTAX MARKER | N | V | ADJ | ADV | CONJ | ... | PREP | INTERJ | PART | CLASSIFIER |
|---|---|---|---|---|---|---|---|---|---|---|
| N | 1 | 1 | 1 | 1 | 1 | ... | 1 | 0 | 1 | 1 |
| V | 1 | 1 | 1 | 0 | 1 | ... | 1 | 0 | 1 | 0 |
| ADJ | 1 | 0 | 1 | 0 | 1 | ... | 0 | 0 | 0 | 0 |
| ADV | 0 | 1 | 1 | 1 | 0 | ... | 0 | 0 | 0 | 0 |
| CONJ | 1 | 1 | 1 | 1 | 0 | ... | 0 | 0 | 0 | 0 |
| : | : | : | : | : | : | ... | : | : | : | : |
| PREP | 1 | 1 | 1 | 1 | 0 | ... | 0 | 0 | 0 | 0 |
| INTERJ | 1 | 1 | 1 | 1 | 0 | ... | 0 | 0 | 1 | 0 |
| PART | 0 | 0 | 0 | 0 | 0 | ... | 0 | 0 | 1 | 0 |
| CLASSIFIER | 1 | 1 | 1 | 1 | 0 | ... | 0 | 0 | 0 | 0 |

N: NOUN

V: VERB

ADJ: ADJECTIVE

ADV: ADVERB

CONJ: CONJUNCTION

PREP: PREPOSITION

INTERJ: INTERJECTION

PART: PARTICIPLE

FIG.9

| ERAR-PART SEMANTIC CODE | POSSIBLE FRONT-PART SEMANTIC CODES |
|---|---|
| : | : |
| 061B | 828H |
| : | : |
| 1310 | 369, 200, 227A, 940D |
| : | : |
| 3600 | 166B, 155A |
| : | : |
| 822B | 126B |
| : | : |
| 940D | 822B, 369 |
| : | : |
| : | : |

FIG. 10

INPUT SENTENCE 把他的確實行動作了分析
NO. OF CYCLES: 7

| CHARACTER | | CANDIDATE WORD | FREQUENCY OF USE | EFFECTIVE CLOSE CHARACTER NUMBER | INITIAL PROBABILITY | RUN2 | RUN4 | RUN6 | RUN7 |
|---|---|---|---|---|---|---|---|---|---|
| 1 | 把 | 把 | 1 | 1 | 1.000 | 1.000 | 1.000 | 1.000 | 1.000 |
| 2 | 他 | 他 | 9076 | 3 | 1.000 | 1.000 | 1.000 | 1,000 | 1.000 |
| 3 | 的 | 的 | 30000 | 3 | 0.999 | 1.000 | 1.000 | 1.000 | 1.000 |
| 4 | 的 | 的確 | 1 | 4 | 0.000 | 0.000 | 0.000 | 0.000 | 0.000 |
| 5 | 確 | 的確 | 1 | 4 | 0.007 | 0.016 | 0.000 | 0.000 | 0.000 |
| 6 | 確 | 確 | 77 | 3 | 0.531 | 0.302 | 0.000 | 0.000 | 0.000 |
| 7 | 確 | 確實 | 67 | 4 | 0.462 | 0.681 | 1.000 | 1.000 | 1.000 |
| 8 | 實 | 確實 | 67 | 4 | 0.203 | 0.452 | 0.857 | 1.000 | 1.000 |
| 9 | 實 | 確實 | 179 | 4 | 0.542 | 0.337 | 0.065 | 0.000 | 0.000 |
| 10 | 實 | 實行 | 84 | 5 | 0.255 | 0.210 | 0.060 | 0.000 | 0.000 |
| 11 | 行 | 實行 | 84 | 5 | 0.121 | 0.136 | 0.051 | 0.000 | 0.000 |
| 12 | 行 | 行 | 446 | 4 | 0.640 | 0.395 | 0.089 | 0.000 | 0.000 |
| 13 | 行 | 行動 | 167 | 4 | 0.240 | 0.469 | 0.860 | 1.000 | 1.000 |
| 14 | 動 | 行動 | 167 | 4 | 0.367 | 0.412 | 0.677 | 0.822 | 1.000 |
| 15 | 動 | 動 | 175 | 3 | 0.385 | 0.129 | 0.019 | 0.007 | 0.000 |
| 16 | 動 | 動作 | 113 | 4 | 0.248 | 0.459 | 0.304 | 0.170 | 0.000 |
| 17 | 作 | 動作 | 113 | 4 | 0.132 | 0.000 | 0.000 | 0.000 | 0.000 |
| 18 | 作 | 作 | 745 | 3 | 0.868 | 1.000 | 1.000 | 1.000 | 1.000 |
| 19 | 了 | 了 | 11061 | 4 | 1.000 | 1.000 | 1.000 | 1.000 | 1.000 |
| 20 | 分 | 分 | 776 | 2 | 0.927 | 0.630 | 0.175 | 0.000 | 0.000 |
| 21 | 分 | 分析 | 61 | 2 | 0.073 | 0.370 | 0.825 | 1.000 | 1.000 |
| 22 | 析 | 分析 | 61 | 2 | 0.938 | 1.000 | 1.000 | 1.000 | 1.000 |
| 23 | 析 | 析 | 4 | 1 | 0.062 | 0.000 | 0.000 | 0.000 | 0.000 |

WORD SEGMENTATION RESULT: 把 他 的 確實 行動 作 了 分析

FIG. 12

CHINESE WORD SEGMENTATION APPARATUS

BACKGROUND OF THE INVENTION

1. Field of the Invention

The invention relates to a Chinese word segmentation apparatus that uses computer techniques to perform word segmentation of a Chinese sentence.

2. Description of the Related Art

In this age of computer application studies, the use of computers to process natural languages, such as Chinese, English, etc., has become a popular field of research. Automated translation, speech processing, text auto correction, computer aid instruction and so on, are commonly referred to as natural language processing. In the analytical processing of a sentence in a natural language, the steps therefor can be divided consecutively into input, word segmentation, syntax analysis and semantic analysis. Word segmentation is referred to as the process of transforming a character string sequence in an input sentence into a word sequence. For example, if the input sentence is “昨天下雨” the possible word segmentation results include “昨*天*下*雨” “昨天*下*雨” “昨*天*下雨” “昨*把他的確*雨” “昨天*下雨” and so on. The process of using a computer to quickly find the correct result “昨天*下雨” from the candidate words is a word segmentation technique. If the word segmentation quality is poor, even when syntax analysis quality and semantic analysis quality are enhanced, the quality of the language analysis will not be improved. Therefore, as to how the quality of Chinese computer word segmentation can be made better has now become an important topic.

FIG. 11 illustrates a process flowchart of an embodiment of a conventional Chinese word segmentation technique, such as that disclosed in an article entitled “Automatic Word Identification in Chinese Sentences by the Relaxation Technique,” pages 423–431, 1987 Republic of China National Computer Conference Papers. As shown, 1115 denotes a dictionary for storing words, words lengths, and frequency of use of the words. In step 1101, an input device is used to input a Chinese sentence. In step 1105, all possible words in the input Chinese sentence are found with the use of the dictionary 1115. In step 1110, with the aid of the dictionary 1115, each character is assigned to a possible word to which the character belongs and, according to the assignment, an initial probability is calculated. In step 1120, the relationships among the words are analyzed, and matching coefficients for the words are calculated. In step 1130, relaxation iterative calculations are performed using the probabilities and the matching coefficients. The assigned probability distribution of the possible words is continuously adjusted until end conditions are met. The iterative calculations can be terminated at this time. In step 1140, the optimum word segmentation result is outputted to a printer, and processing is completed. Relaxation iterative calculation is the process of obtaining corrected probability values by referring the initial probabilities for all of the word assignments to a predefined probability correction formula. In the illustrative processing example of FIG. 12, after seven runs for the input sentence “把他的確實行動做了分析,” the portions that have 1 as the result of the relaxation iterative calculations indicate a word segmentation result. The incorrect word segmentation results will gradually contract to approximate 0. Thus, without the aid of semantic or syntax information, Chinese word segmentation can be achieved with an accuracy of about 95%.

The drawbacks of the aforementioned Chinese word segmentation technique are as follows:

1. A large Chinese vocabulary database is needed to calculate the frequency of use and initial probability for each word. However, the Chinese vocabulary database as such is not easily obtained.

2. During the relaxation iterative calculations, improper definition of the matching coefficients can easily lead to failure of the coefficients to contract, or in an oscillating phenomenon that will not yield the optimum solution.

3. Relaxation iterative requires repeated computations and thus need a longer calculating time that affects the operating efficiency.

4. A 95% word segmentation accuracy is inadequate for some applications, such as in automated translation.

SUMMARY OF THE INVENTION

Therefore, the main object of the present invention is to provide a Chinese word segmentation apparatus capable of overcoming the aforementioned drawbacks that are commonly associated with the prior art.

In order to solve the aforesaid problems, the present invention provides a Chinese word segmentation apparatus that employs computer techniques using phonetic symbol information to replace troublesome probability calculations and that uses a few semantics and syntax rules in order to perform word segmentation processing on an input Chinese sentence. The Chinese word segmentation apparatus is characterized by:

a dictionary for characters with different pronunciations that stores all of the characters in the Chinese language with different pronunciations, all of the character phonetic symbols corresponding to the characters with the different pronunciations, and all of the candidate words corresponding to each of the character phonetic symbols and word phonetic symbols corresponding to the candidate words;

a character phonetic dictionary that stores all of the characters in the Chinese language, initial preset phonetic symbols corresponding to the characters, and other possible phonetic symbols for the characters;

a system dictionary that stores phonetic symbols of Chinese characters or words, similarly sounding conflicting characters or similarly sounding conflicting words corresponding to the phonetic symbols, and frequency of use, syntax markers and semantic markers corresponding to each of the similarly sounding conflicting characters or the similarly sounding conflicting words;

a syntax information portion that stores a two-dimensional array formed from “1” or “0” bits to indicate whether or not different word categories can be connected in the Chinese language;

a semantic information portion that stores rear-part semantic code of Chinese words and possible front-part semantic code corresponding to the rear-part semantic code;

a character-to-phonetic converting portion that refers to the dictionary for characters with different pronunciations and to the character phonetic dictionary in order to convert a Chinese character string inputted to a computer into a phonetic symbol string;

a candidate word-selecting portion that cuts the phonetic symbol string transmitted from the character-to-phonetic converting portion into syllables, that obtains all possible candidate words from the system dictionary by using each of the syllables as an indexing term, and that discards all unfeasible candidate words by referring to the inputted Chinese character string;

an optimum candidate character string-deciding portion that interconnects the candidate words in the form of a directional network using starting and ending positions of each of the non-discarded candidate words in the inputted character string, that calculates semantic similarity degree prioritization and syntax prioritization for each of the candidate words by referring to the syntax information portion and the semantic information portion while taking into account the syntax markers and the semantic markers of every two back-to-back candidate words, that obtains a total estimate that is a function of frequency of use prioritization, word length prioritization, the syntax prioritization and the semantic similarity degree prioritization, and that finds a route for achieving an optimum estimate grade for word segmentation by using a dynamic programming method; and a word segmentation marking portion that retrieves the candidate words in the optimum route and that adds word segmentation markers thereto.

According to the construction of the Chinese word segmentation apparatus of this invention, the character-to-phonetic converting portion converts an input sentence into a phonetic symbol string while referring to the character phonetic dictionary and the dictionary for characters with different pronunciations using the characters in the sentence as indexing terms. Thereafter, the candidate word-selecting portion retrieves from the system dictionary all of the possible candidate words in the phonetic symbol string using the phonetic symbols as indexing terms, and inspects the possible candidate words by referring to the characters in the input sentence in a buffer region. Subsequently, the optimum candidate character string-deciding portion refers to the semantic information portion and the syntax information portion to obtain a total estimate that is a function of frequency of use prioritization, word length prioritization, semantic similarity prioritization and syntax prioritization for the possible candidate words, and finds an optimum route for word segmentation. The word segmentation marking portion retrieves the input character string from the buffer region, and adds word segmentation markers to the input character string with reference to the optimum route before outputting the same.

BRIEF DESCRIPTION OF THE DRAWINGS

Other features and advantages of the present invention will become apparent in the following detailed description of the preferred embodiment with reference to the accompanying drawings, of which:

FIG. 7 illustrates a character phonetic dictionary of the preferred embodiment of this invention;

FIG. 8 illustrates a system dictionary of the preferred embodiment of this invention;

FIG. 9 illustrates a syntax information portion of the preferred embodiment of this invention;

FIG. 10 illustrates a semantic information portion of the preferred embodiment of this invention;

FIG. 12 is an example to illustrate a relaxation iterative processing operation of the conventional word segmentation technique.

DETAILED DESCRIPTION OF THE PREFERRED EMBODIMENT

Figure 1:
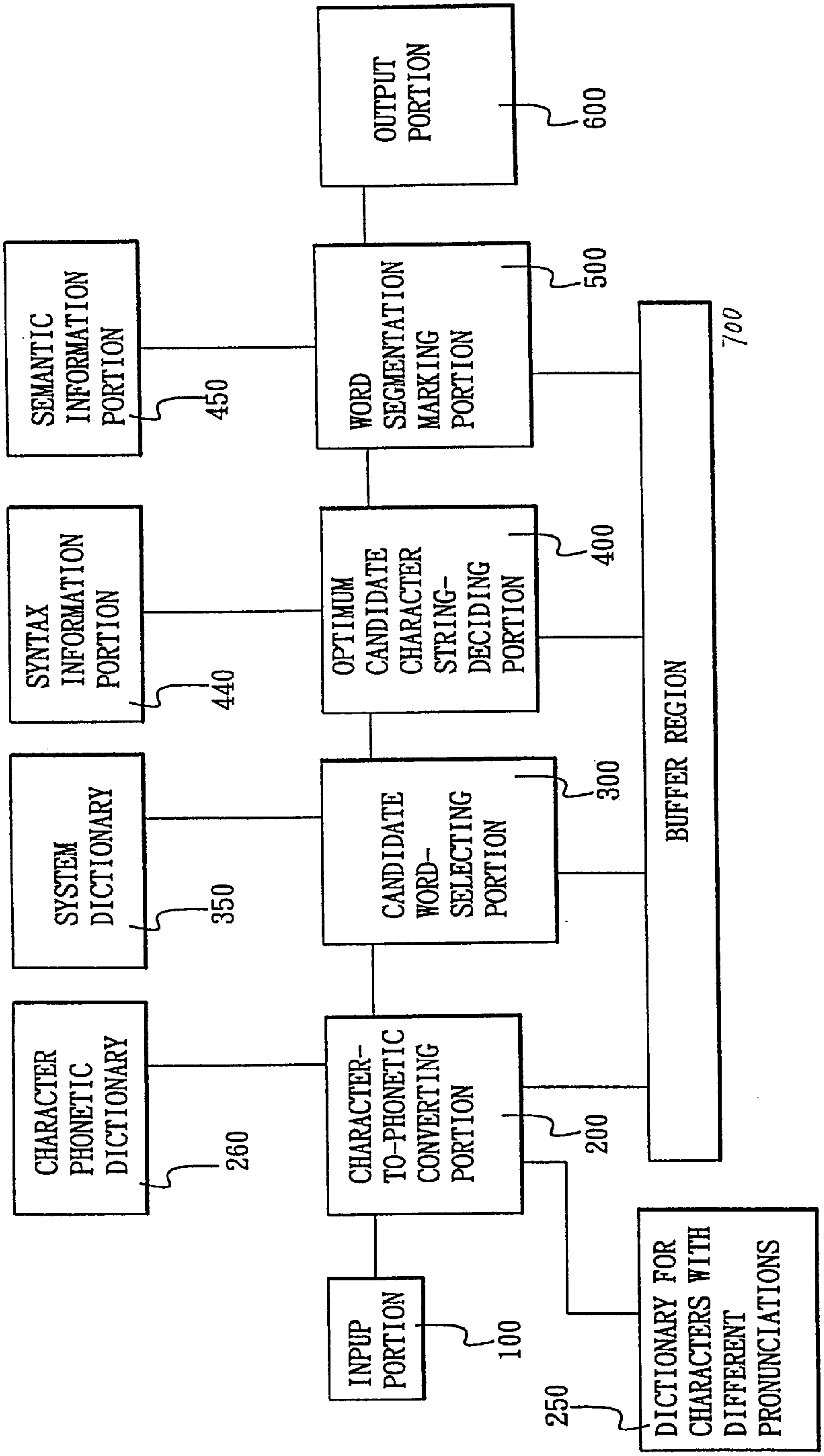
FIG. 1 is a schematic system block diagram of the preferred embodiment of a Chinese word segmentation apparatus according to the present invention.

In the present invention, the term "semantics" refers to the meaning of a word (as indicated by a semantic code). The preferred embodiment of this invention uses the semantic classification method in the 1985 edition of a thesaurus published by Japan Kado Kawa Bookstore. In this classification method, four hexadecimal codes are employed as a classification code of a word. The leftmost code indicates the general class. The second code indicates the sub-class. The third code indicates the section. The rightmost code indicates the sub-section. All of the words in the thesaurus are grouped into ten general classes, i.e. nature, shape, change, action, mood, person, disposition, society, arts and article. Each general class is further divided into ten sub-classes. The following is an example of the semantic classification method:

| semantic Code | Description |
|---|---|
| 0 | Nature Class |
| 02 | Weather Sub-class of the Nature Class |
| 028 | Wind Section of the Weather Sub-class |
| 028a | Strength Sub-section of the Wind Section |

In the aforesaid subdivided-type classification code, the higher the rank of the semantic code, the broader will be the scope of semantic code that is covered thereby. Accordingly, the lower the rank of the semantic code, the narrower will be the scope of semantic code that is covered thereby. Thus, the semantic code as such can be applied to meet the actual requirements. For example, to represent weather, only the codes 02 need to be used. There is no need to expand the codes 02 to 021, 022, etc., thereby reducing the memory space. Moreover, since these semantic code are expressed in terms of numbers, they can be used in mathematical computation methods, such as in set logic computations, for processing the semantic code to derive more information of value. As to the detailed description of the semantic code, one may refer to R.O.C. Patent Publication No. 161238, entitled "Machine Translator Apparatus," the entire disclosure of which is incorporated herein by reference.

In addition, according to R.O.C. Patent Publication No. 089476, entitled "Chinese Character Transforming Apparatus (II)," the entire disclosure of which is incorporated herein by reference, when converting a Chinese phonetic symbol string into a character string, the word length is an important factor to be considered. In this embodiment, word length prioritization is also one of the factors considered in word segmentation. The calculation thereof is as follows:

Word length prioritization=(Number of characters in candidate word−1)*2

For example, if the candidate word is "日月潭" the word length prioritization therefor is (3−1)*2=4.

Furthermore, the preferred embodiment of this invention also involves syntax information as an enhancing factor in word segmentation. As shown in FIG. 9, the syntax information involves automatic learning of a marked large vocabulary database to refer to word categories, such as noun, adjective, verb, etc., of two words connected back-to-back in order to obtain a two-dimensional array. A value of 0 indicates that the two word categories cannot be placed beside each other, while a value of 1 indicates that the two word categories can be placed beside each other. The definition of syntax prioritization as a factor in word segmentation estimation is as follows:

Syntax prioritization=Syntax information value of (front-part word category, rear-part word category)*5

In addition, the preferred embodiment of this invention also involves semantic information as an enhancing factor in word segmentation. As shown in FIG. 10, the semantic information also involves automatic learning of the marked large vocabulary database to obtain continuity semantic information. Since the semantic code in use employ the subdivided-type format, calculation of the semantic similarity degree of back-to-back consecutive words can be done using set intersection computations. For example, the result of a set intersection computation for semantic code "7140" and "714a" is "714". Since the result of the computation only includes three codes, the semantic similarity degree is deemed to be ¾. Accordingly, if the result includes four codes, the semantic similarity degree is deemed to be 1. If the result includes only two codes, the semantic similarity degree is deemed to be ½. If the result includes only one code, the semantic similarity degree is deemed to be ¼. If the result is a null set, the semantic similarity degree is deemed to be 0.

Figure 6:
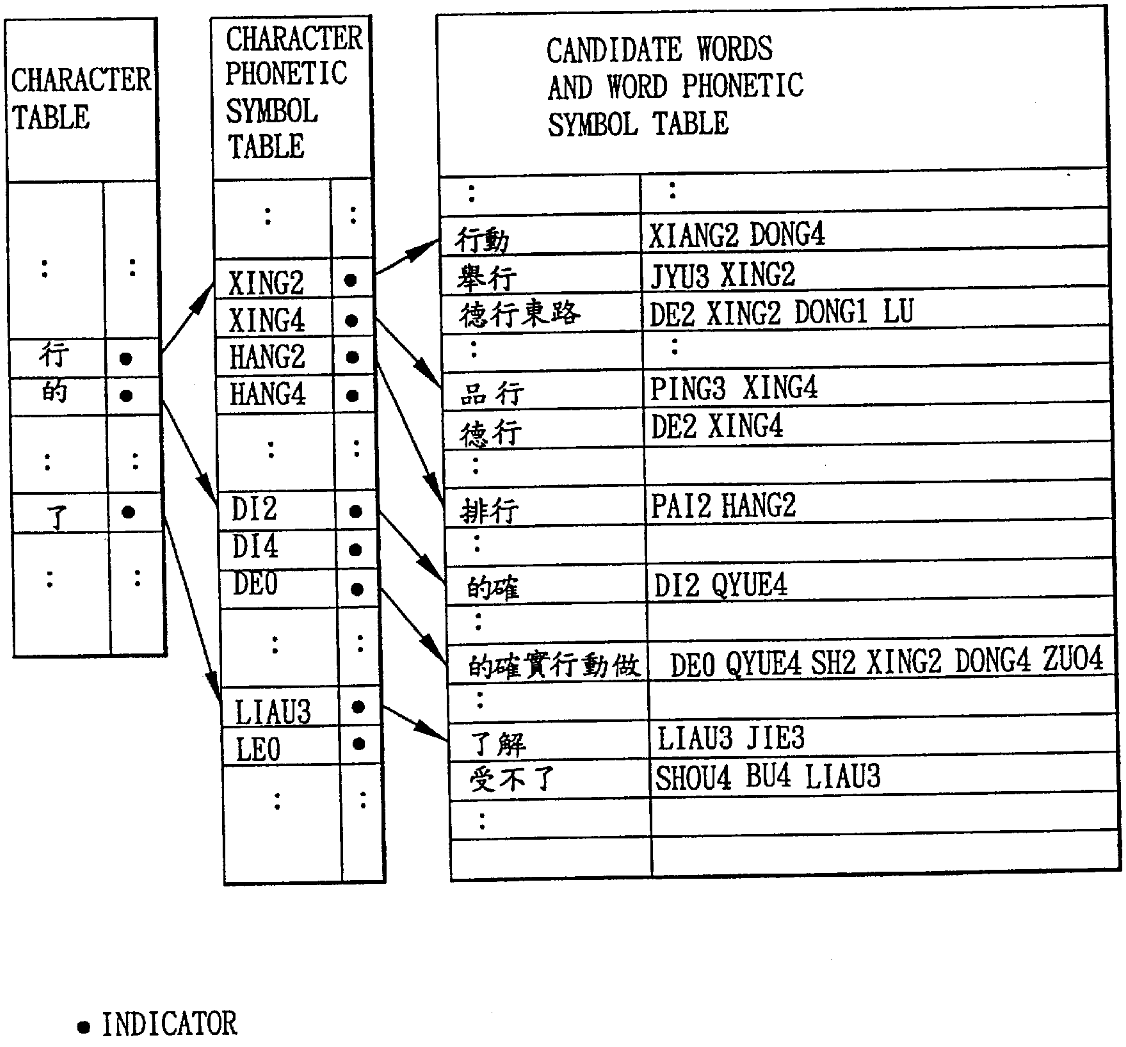
FIG. 6 illustrates a dictionary for characters with different pronunciations according to the preferred embodiment of this invention.
Figure 11:
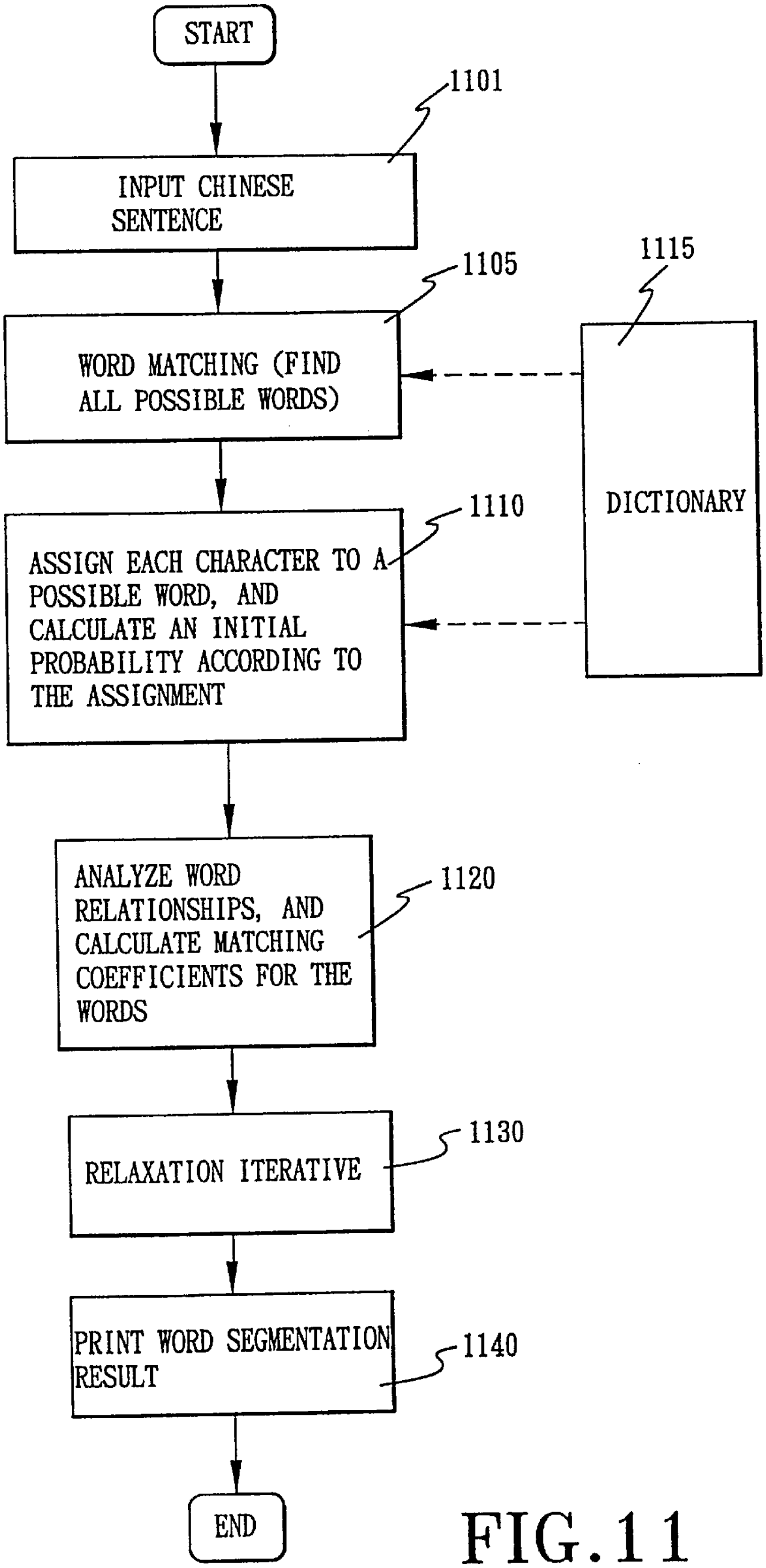
FIG. 11 is a process flowchart illustrating a conventional word segmentation technique.

FIG. 1 illustrates a schematic system block diagram of the preferred embodiment of a Chinese word segmentation apparatus according to the present invention. As shown in this figure, 250 denotes a dictionary for characters with different pronunciations that is used to store all of the characters in the Chinese language with different pronunciations, all of the character phonetic symbols corresponding to the characters with the different pronunciations, and all of the candidate words and word phonetic symbols corresponding to each of the character phonetic symbols. The dictionary 250 is shown in FIG. 6. 260 denotes a character phonetic dictionary that is used to store all of the characters in the Chinese language, the initial preset phonetic symbols corresponding to the characters, and other possible phonetic symbols for the characters. The character phonetic dictionary 260 is shown in FIG. 7. 350 denotes a system dictionary that is used to store phonetic symbols of Chinese characters or words, similarly sounding conflicting characters or similarly sounding conflicting words corresponding to each of the phonetic symbols, and frequency of use, syntax marker and semantic marker corresponding to each of the similarly sounding conflicting characters or similarly sounding conflicting words. The system dictionary 350 is shown in FIG. 8. 440 denotes a syntax information portion that is used to store a two-dimensional array formed from "1" or "0" bits to indicate whether or not different word categories can be connected in the Chinese language. The syntax information portion 440 is shown in FIG. 9. 450 denotes a semantic information portion that is used to store rear-part semantic code of Chinese words and possible front-part semantic code corresponding to the rear-part semantic code. The semantic information portion 450 is shown in FIG. 10. 100 denotes an input portion, such as a keyboard, for inputting a Chinese character string. 200 denotes a character-to-phonetic converting portion that refers to the dictionary 250 for characters with different pronunciations and to the character phonetic dictionary 260 in order to convert the Chinese character string inputted from the input portion 100 into a phonetic symbol string. 300 denotes a candidate word-selecting portion that is used to cut the phonetic symbol string obtained from the character-to-phonetic converting portion into syllables, to obtain all possible candidate words from the system dictionary 350 by using each of the syllables as an indexing term, and to discard unfeasible candidate words by referring to the inputted character string from the input portion 100. 400 denotes an optimum candidate character string-deciding portion that is used to interconnect the candidate words in the form of a directional network using starting and ending positions of each of the candidate words in the inputted character string from the input portion 100 as indexing terms, to calculate semantic similarity degree prioritization and syntax prioritization by referring to the syntax information portion 440 and the semantic information portion 450 while taking into account the syntax markers and the semantic markers of every two back-to-back candidate words, to obtain a total estimate that is a function of frequency of use prioritization, word length prioritization, syntax prioritization and semantic similarity degree prioritization, and to find a route for achieving an optimum estimate grade for word segmentation using a dynamic programming method. 500 denotes a word segmentation marking portion that is used to retrieve in sequence the candidate words in the optimum route and to add segmentation markers thereto. 600 denotes an output portion for outputting the marked character string. 700 denotes a buffer region formed from a memory device for providing temporary storage of the input character string and the intermediate processing results.

Figure 2:
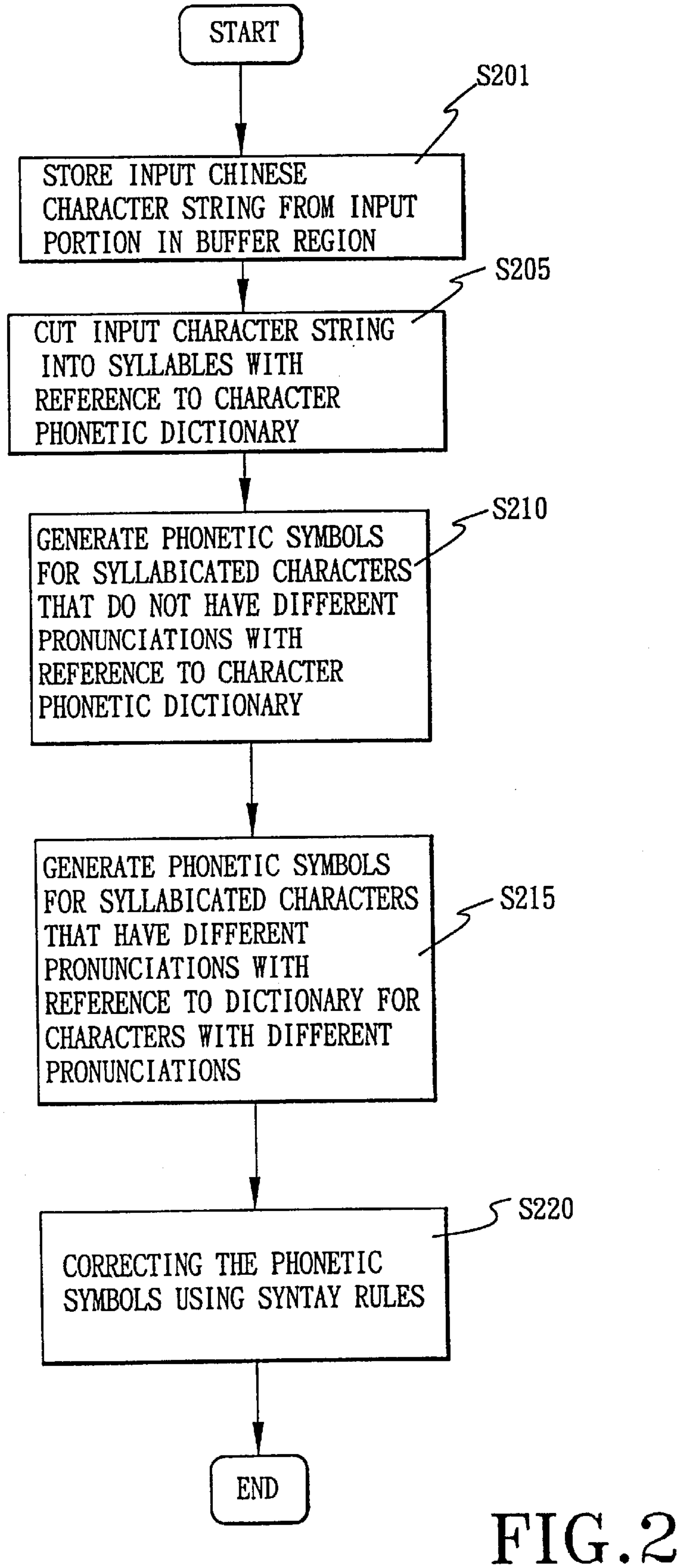
FIG. 2 is a process flowchart of a character-to-phonetic converting portion of the preferred embodiment of this invention.

FIG. 2 illustrates the process flowchart of the character-to-phonetic converting portion 200. In step s201, the input Chinese character string from the input portion 100 is stored in the buffer region 700. In step s205, the input Chinese sentence is cut into syllables with reference to the character phonetic dictionary 260. In step s210, the phonetic symbols for syllabicated characters that do not have different pronunciations are generated with reference to the character phonetic dictionary 260. In step s215, the phonetic symbols for syllabicated characters that have different pronunciations are generated with reference to the dictionary 250 for characters with different pronunciations in a sequence from the tail end to the head end of the character string. In step s220, simple syntax rules are used to correct the phonetic symbols. For example, the phonetic symbols for the word "媽媽" after conversion are "ㄇㄚ ... ㄇㄚ ...". However, the second syllable is actually read with a light sound. Thus, in this step, the phonetic symbols are corrected with reference to the syntax rules into "ㄇㄚㄇㄚ•". Processing ends after step s220.

Figure 3:
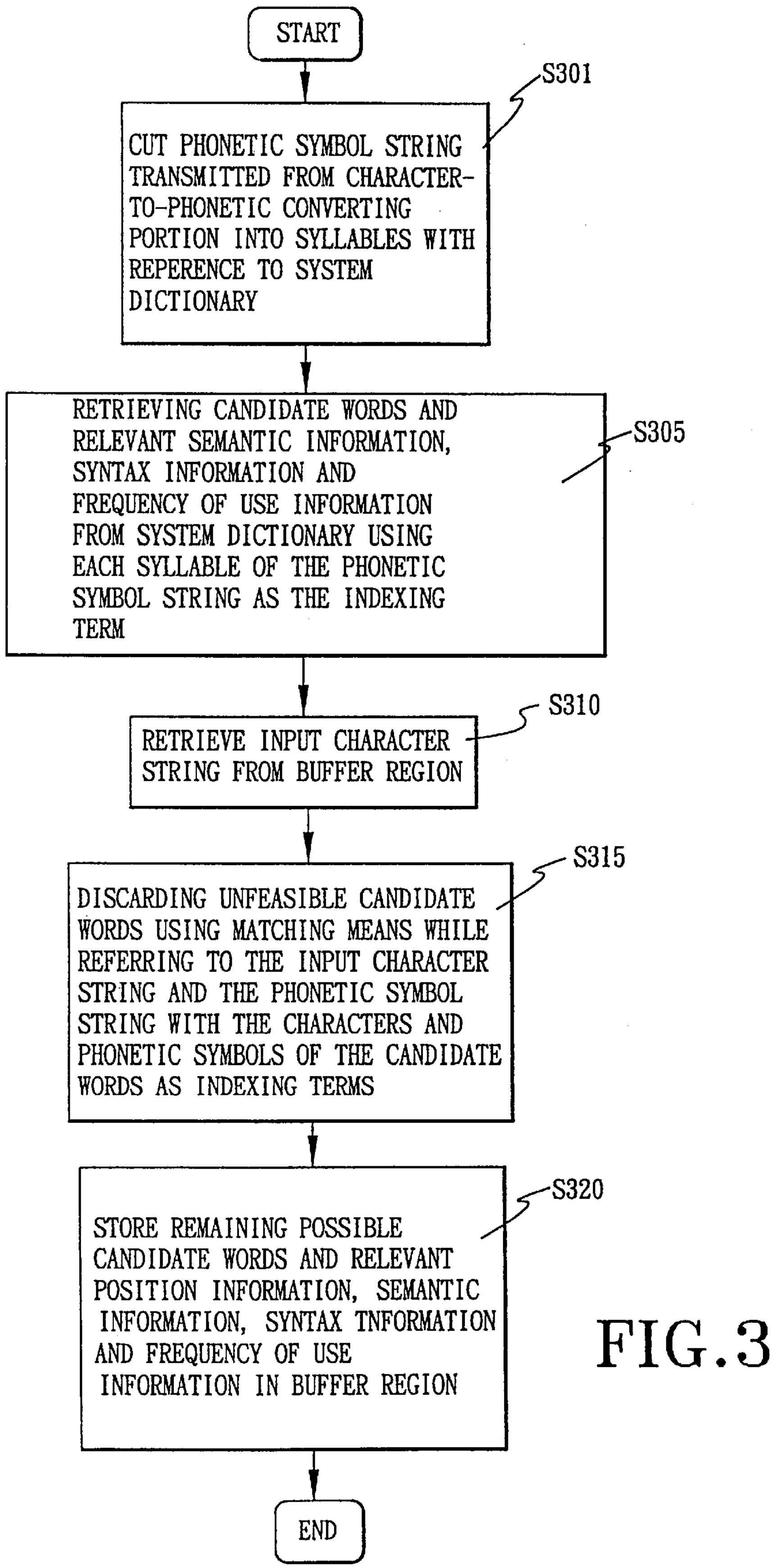
FIG. 3 is a process flowchart of a candidate word-selecting portion of the preferred embodiment of this invention.

FIG. 3 illustrates the process flowchart of the candidate word-selecting portion 300. Instep s301, the phonetic symbol string transmitted from the character-to-phonetic converting portion 200 is cut into syllables with reference to the system dictionary 350. In step s305, the candidate words and the relevant semantic information, syntax information and frequency of use information are retrieved from the system dictionary 350 using each syllable of the phonetic symbol string as the indexing term. In step s310, the input character string is retrieved from the buffer region 700. In step s315, with the characters and phonetic symbols of the candidate words as indexing terms, unfeasible candidate words are discarded using matching means while referring to the input character string and the phonetic symbol string. In step s320, the remaining possible candidate words and the relevant position information, semantic information, syntax information and frequency of use information are stored in the buffer region 700. Processing is subsequently terminated.

Figure 4:
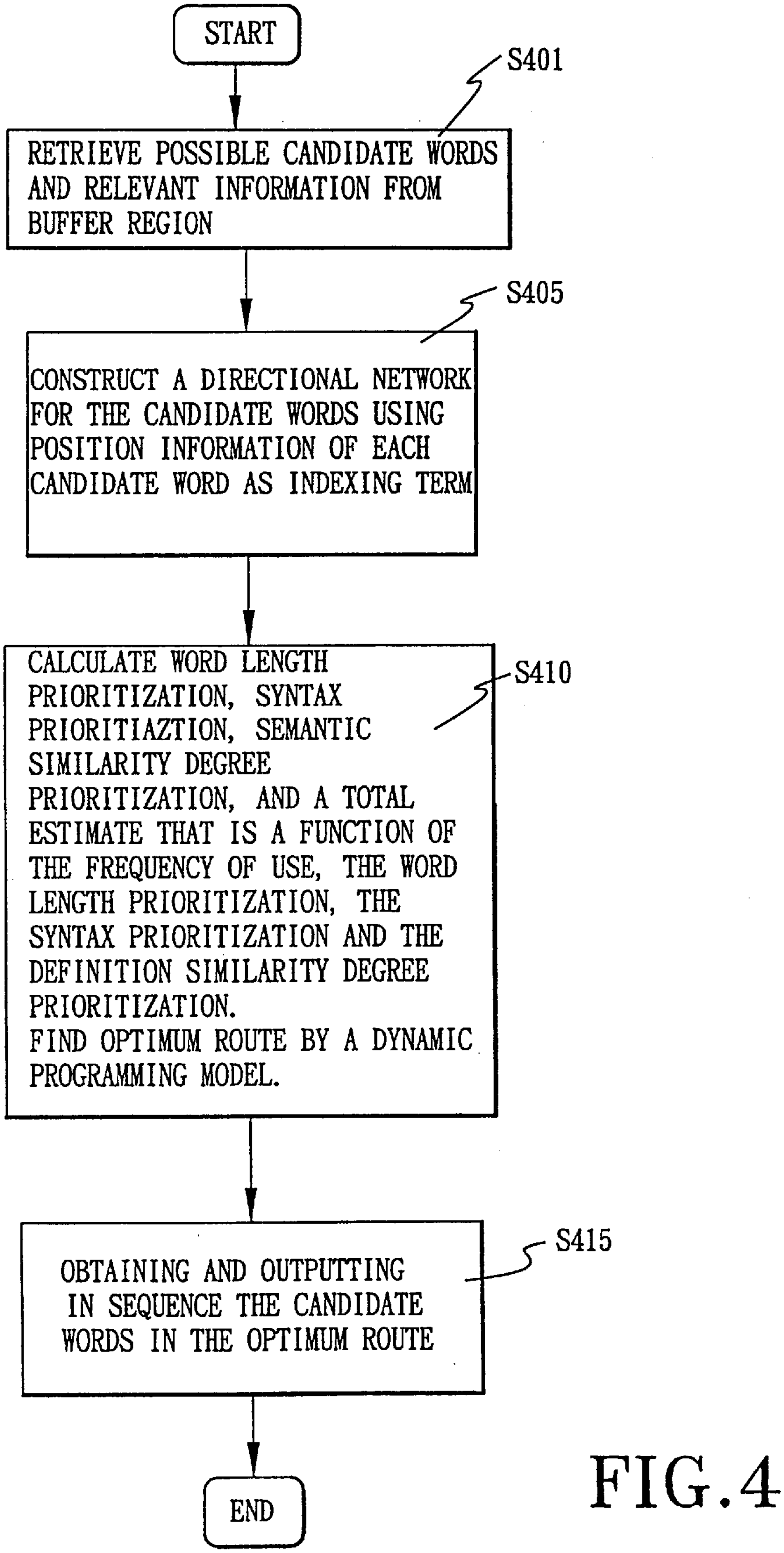
FIG. 4 is a process flowchart of an optimum candidate character string-deciding portion of the preferred embodiment of this invention.

FIG. 4 illustrates the process flowchart of the optimum candidate word string-deciding portion 400. In step s401, the possible candidate words and the relevant information are retrieved from the buffer region 700. In step s405, a directional network for the candidate words is constructed using the position information of each candidate word as an indexing term. For example, when the word tail end position information of a front candidate word is 4 (the fourth character in the input character string), and the word head end position information of a rear candidate word is 5 (the fifth character in the input character string), this indicates that the two candidate words can be connected. Instep s410, the word length prioritization, the syntax prioritization, and the semantic similarity degree prioritization are calculated. Thereafter, a total estimate that is a function of the frequency of use, the word length prioritization, the syntax prioritization and the semantic similarity degree prioritization is calculated. After a dynamic programming model to find the optimum route, the candidate words in the optimum route are sequentially obtained and outputted. Processing is subsequently terminated.

Figure 5:
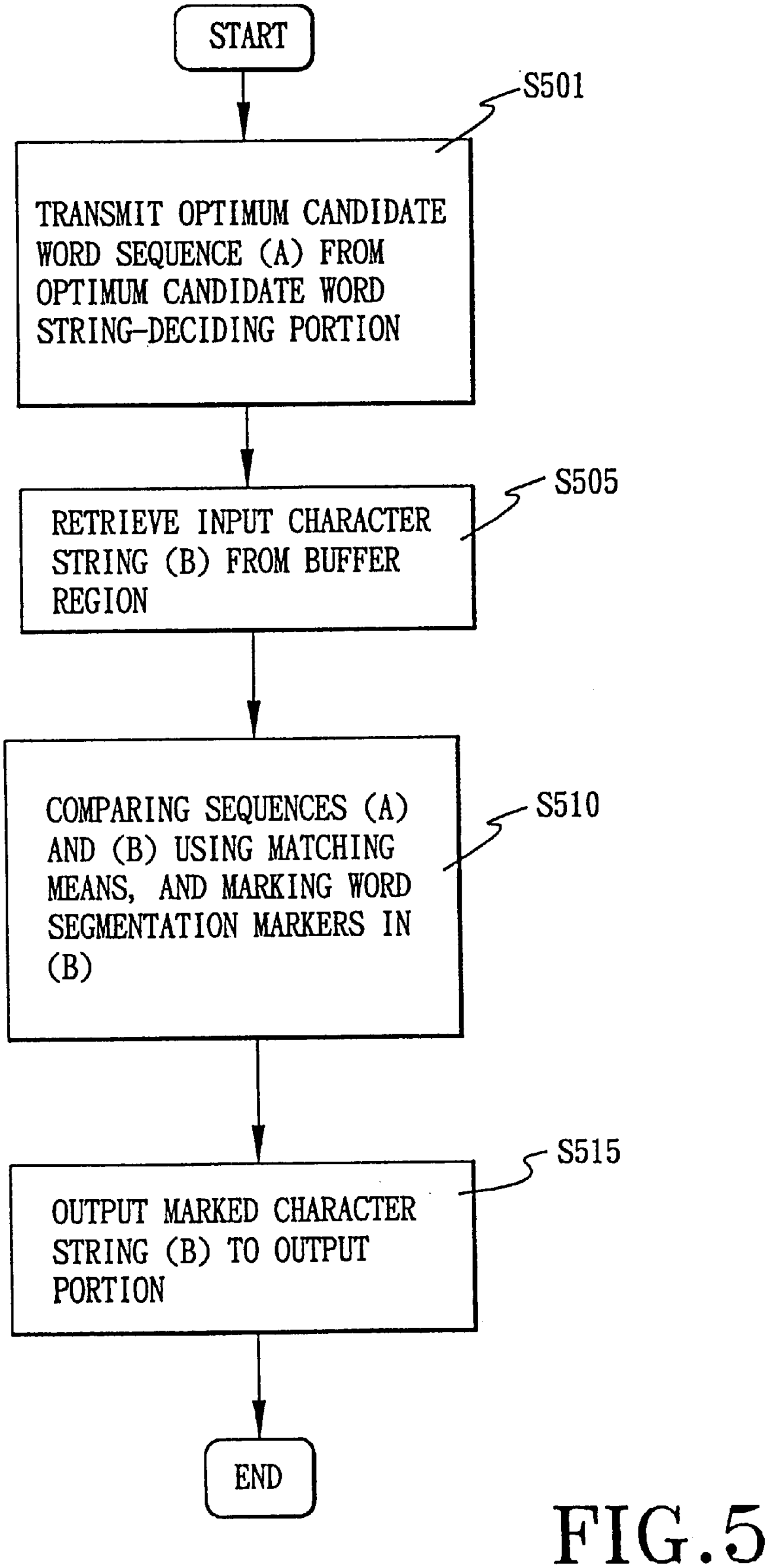
FIG. 5 is a process flowchart of a word segmentation marking portion of the preferred embodiment of this invention.

FIG. 5 illustrates the process flowchart of the word segmentation marking portion 500. In step s501, the optimum candidate word sequence (A) is transmitted from the optimum candidate word string-deciding portion 400. In step s505, the input character string (B) is retrieved from the buffer region 700. In step s510, the sequence (A) and the sequence (B) are compared using matching means, and word segmentation markers are marked in the sequence (B). In step s515, the marked character string is outputted to the output portion 600. Processing is terminated at this time.

In the example where "把他的確實行動做了研究" is inputted using the input portion 100, the character-to-phonetic converting portion 200 of the Chinese word segmentation apparatus of this invention initially processes the same. First, the characters in the sentence that do not have different pronunciations are converted with reference to the character-to-phonetic dictionary 260 to obtain the result "ba3ta1 的 qyue4sh2 行 dong4zuo4 了 ian2jiou4". Thereafter, starting from the tail end to the head end of the sentence, it is found by referring to the dictionary 250 for characters with different pronunciations that the characters "了研" and "做了" do not form a corresponding word. Thus, the character "了" is converted to the initial preset value "le0". By the same logic, with reference to the dictionary 250 while using the characters "行動" as an indexing term, it is determined that the pronunciation therefor is "xing2dong4". Thus, the character "行" is converted to "xing2". Thereafter, while the characters "的確" have a corresponding candidate pronunciation in "di2qyue4," since the pronunciation of the characters "的確實行動 做了" is "de0qyue4sh2xing2dong4zuo4," the pronunciation "di2qyue4" of the characters "的確" will be abandoned, and the character "的" will be converted to "de0" because of the longer word priority rule. Thus, the result of the conversion from character string to phonetic symbol string is as follows:

"ba3ta1de0qyue4sh2xing2dong4zuo4le0ian2jiou4"

The conversion result, together with the input character string, are stored in the buffer region 700. Subsequently, the candidate word-selecting portion 300 operates according to the process flowchart of FIG. 3. By referring to the system dictionary 350, the phonetic symbol string is cut into all possible syllables as follows:

ba3-ta1-de0-qyue4-sh2-xing2-dong4-zuo4-le0-ian2-jiou4
ba3-ta1-de0-qyue4sh2-xing2-dong4-zuo4-le0-ian2-jiou4
ba3-ta1-de0-qyue4-sh2xing2-dong4-zuo4-le0-ian2-jiou4
ba3-ta1-de0-qyue4-sh2-xing2dong4-zuo4-le0-ian2-jiou4
ba3-ta1-de0-qyue4sh2-xing2dong4-zuo4-le0-ian2-jiou4
ba3-ta1-de0-qyue4sh2-xing2-dong4-zuo4-le0-ian2jiou4
ba3-ta1-de0-qyue4-sh2xing2-dong4-zuo4-le0-ian2jiou4
ba3-ta1-de0-qyue4-sh2-xing2dong4-zuo4-le0-ian2jiou4
ba3-ta1-de0-qyue4sh2-xing2dong4-zuo4-le0-ian2jiou4

Thereafter, with the use of the possible syllables of the phonetic symbols as indexing terms, the following exemplary possible candidate words are obtained with reference to the system dictionary 350:

ba3 ta1 de0 qyue4 sh2 xing2 dong4 zuo4 le0 ian2 jiou4

| | | | | | | | | | | |
|---|---|---|---|---|---|---|---|---|---|---|
| | | | 確 | 實 | | | | | 研 | 究 |
| | | | | 實 | 行 | | | | | |
| | | | | | 行 | 動 | | | | |
| 把 | 它 | 的 | 卻 | 時 | 形 | 凍 | 坐 | 了 | 研 | 舊 |
| 靶 | 他 | | 確 | 實 | 行 | 動 | 做 | | 言 | 究 |
| : | : | : | : | : | : | : | : | : | : | : |

Subsequently, with reference to the input character string "把他的確實行動做了研究" stored in the buffer region 700 and the corresponding position information, comparing means is employed to eliminate the candidate words different from the input character string. The possible candidate words are as follows:

ba3 ta1 de0 qyue4 sh2 xing2 dong4 zuo4 le0 ian2 jiou4

| | | | | | | | | | | |
|---|---|---|---|---|---|---|---|---|---|---|
| | | | 確 | 實 | | | | | 研 | 究 |
| | | | | 實 | 行 | | | | | |
| | | | | | 行 | 動 | | | | |
| 把 | 他 | 的 | 確 | 實 | 行 | 動 | 做 | 了 | 研 | 究 |

Thereafter, relevant information, such as the semantic information, syntax information, frequency of use information, etc., from the system dictionary 350 and the position information for each of the candidate words are stored in the buffer region 700. Then, the optimum candidate character string-deciding portion 400 retrieves the possible candidate words and the relevant information from the buffer region 700. Based on the position information of each candidate word (i.e. information as to whether or not candidate words can be placed back-to-back), a directional network is constructed as follows:

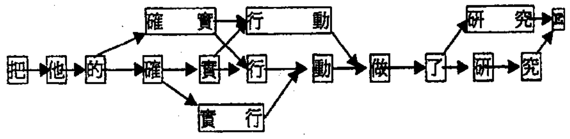

Next, the optimum candidate character string-deciding portion 400 calculates the word length prioritization, the syntax prioritization, and the sematic similarity degree prioritization. A total estimate that is a function of the frequency of use, the word length prioritization, the syntax prioritization and the semantic similarity degree prioritization is then calculated. After a dynamic programming method, the optimum route sequence is found to be

"把 → 他 → 的 → 確實 → 行動 → 做 → 了 → 研究".

Finally, the word segmentation marking portion 500 retrieves the input character string from the buffer region 700 and, based on the optimum character string sequence, inserts markings the input character string as follows: "把*他*的*確實*行動*做了*了*研究". The marked character string is then provided to the output portion 600.

From the foregoing, it is apparent that the Chinese word segmentation apparatus of this invention can overcome the problems associated with the prior art. The effects of the present invention are as follows:

1. There is no need for a large vocabulary database, and a Chinese word segmentation accuracy of more than 98% can be achieved.

2. The possible candidate words can be reduced to a minimum to substantially increase the operating efficiency.

3. The apparatus can make use of existing Chinese character to phonetic technical conversion resources, such as computation means, system dictionary, etc. to achieve maximum results with less effort.

4. Not only can word segmentation be performed, the problems associated with different word categories can also be overcome.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A Chinese word segmentation apparatus that uses computer techniques to perform word segmentation processing on an input Chinese sentence, characterized by:

a dictionary for characters with different pronunciations that stores all of the characters in the Chinese language with different pronunciations, all of the character phonetic symbols corresponding to the characters with the different pronunciations, and all of the candidate words corresponding to each of the character phonetic symbols and word phonetic symbols corresponding to the candidate words;

a character phonetic dictionary that stores all of the characters in the Chinese language, initial preset phonetic symbols corresponding to the characters, and other possible phonetic symbols for the characters;

a system dictionary that stores phonetic symbols of Chinese characters or words, and frequency of use, syntax markers and semantic markers corresponding to each of similarly sounding conflicting characters or similarly sounding conflicting words that correspond in turn with each of the phonetic symbols;

a syntax information portion that stores a two-dimensional array formed from "1" or "0" bits to indicate whether or not different word categories can be connected in the Chinese language;

a semantic information portion that stores rear-part semantic code of Chinese words and possible front-part semantic code corresponding to the rear-part semantic code;

a character-to-phonetic converting portion that refers to the dictionary for characters with different pronunciations and to the character phonetic dictionary in order to convert a Chinese character string inputted to a computer into a phonetic symbol string;

a candidate word-selecting portion that cuts the phonetic symbol string transmitted from the character-to-phonetic converting portion into syllables, that obtains all possible candidate words from the system dictionary by using each of the syllables as an indexing term, and that discards all unfeasible candidate words by referring to the inputted Chinese character string;

an optimum candidate character string-deciding portion that interconnects the candidate words in the form of a directional network using starting and ending positions of each of the non-discarded candidate words in the inputted character string, that calculates semantic similarity degree prioritization and syntax prioritization for each of the candidate words by referring to the syntax information portion and the semantic information portion while taking into account the syntax markers and the semantic markers of every two back-to-back candidate words, that obtains a total estimate that is a function of frequency of use prioritization, word length prioritization, the syntax prioritization and the semantic similarity degree prioritization, and that finds a route for achieving an optimum estimate grade for word segmentation by using a dynamic programming method; and a word segmentation marking portion that retrieves the candidate words in the optimum route and that adds word segmentation markers thereto.

* * * * *

UNITED STATES PATENT AND TRADEMARK OFFICE

CERTIFICATE OF CORRECTION

PATENT NO. : 6,879,951 B1
DATED : April 12, 2005
INVENTOR(S) : J. Kuo

It is certified that error appears in the above-identified patent and that said Letters Patent is hereby corrected as shown below:

Title page,
Item [57], ABSTRACT,
Line 21, before "marking" insert -- is then found by a dynamic programming method. Finally, a word segmentation --.

Signed and Sealed this

Eighteenth Day of October, 2005

JON W. DUDAS
*Director of the United States Patent and Trademark Office*